United States Patent
Alasti et al.

(10) Patent No.: US 7,929,567 B1
(45) Date of Patent: Apr. 19, 2011

(54) DATA RATE MANAGEMENT IN A COMMUNICATION NETWORK

(75) Inventors: Mehdi Alasti, Rockville, MD (US); Behnam Neekzad, Silver Spring, MD (US); Roy Leo Spitzer, Rockville, MD (US); Mohammad Hassan Partovi, Potomac, MD (US)

(73) Assignee: Clear Wireless LLC, Kirkland, WA (US)

( * ) Notice: Subject to any disclaimer, the term of this patent is extended or adjusted under 35 U.S.C. 154(b) by 98 days.

(21) Appl. No.: 12/180,767

(22) Filed: Jul. 28, 2008

Related U.S. Application Data (60) Provisional application No. 61/048,039, filed on Apr. 25, 2008.

(51) Int. Cl.
| | |
|---|---|
| H04J 3/16 | (2006.01) |
| H04W 72/02 | (2009.01) |
| H04W 72/04 | (2009.01) |
| H04W 72/06 | (2009.01) |
| H04W 72/08 | (2009.01) |
| H04W 72/10 | (2009.01) |
| H04W 72/12 | (2009.01) |

(52) U.S. Cl. ........ 370/468; 370/538; 370/231; 370/338; 370/349; 455/452.2; 455/453

(58) Field of Classification Search ............... 370/230.1, 370/232, 468, 231, 235, 328, 329, 349, 537, 370/538; 455/450, 452.1, 452.2, 453
See application file for complete search history.

(56) References Cited

U.S. PATENT DOCUMENTS

| | | | |
|---|---|---|---|
| 7,289,514 B2 * | 10/2007 | Robotham et al. | 370/395.4 |
| 7,599,321 B2 * | 10/2009 | Lee et al. | 370/320 |
| 2003/0169690 A1 * | 9/2003 | Mott | 370/238 |
| 2006/0233100 A1 | 10/2006 | Luft et al. | |
| 2007/0206545 A1 * | 9/2007 | Lee et al. | 370/338 |
| 2007/0230427 A1 | 10/2007 | Arseneault et al. | |
| 2008/0002670 A1 | 1/2008 | Bugenhagen et al. | |
| 2008/0084830 A1 * | 4/2008 | Hsieh et al. | 370/252 |
| 2008/0112344 A1 * | 5/2008 | Oleszczuk | 370/310 |
| 2008/0304445 A1 * | 12/2008 | Chou | 370/329 |
| 2009/0116438 A1 * | 5/2009 | Madan et al. | 370/329 |
| 2009/0129265 A1 * | 5/2009 | Ye et al. | 370/230 |
| 2009/0147678 A1 * | 6/2009 | Xhafa et al. | 370/232 |
| 2009/0185526 A1 * | 7/2009 | Barber et al. | 370/328 |

* cited by examiner

*Primary Examiner* — Chi H. Pham
*Assistant Examiner* — Ahmed Elallam
(74) *Attorney, Agent, or Firm* — O'Brien Jones PLLC (57) ABSTRACT

A data transfer system receives a first service flow, a second service flow, and a third service flow that comprise a data session for a user device. The data transfer system transfers the first service flow to a scheduler using a first data rate limit and transfers the second service flow to the scheduler using a second data rate limit. The data transfer system also transfers the third service flow to the scheduler. The scheduler schedules transfers of the first service flow and the second service flow at a higher priority than transfers of the third service flow. The data transfer system transfers the first service flow, the second service flow, and the third service based on the prioritized schedule and using a third data rate limit. Thus, the first and second service flows receive a limited amount of preferential bandwidth, and the third service flow obtains unused bandwidth from the first and second service flows, subject to the third data rate limit.

20 Claims, 5 Drawing Sheets

DATA RATE MANAGEMENT IN A COMMUNICATION NETWORK

REFERENCE

This patent application claims the benefit of U.S. provisional patent application 61/048,039; entitled DATA RATE MANAGEMENT; filed on Apr. 25, 2008; and hereby incorporated by reference into this patent application.

TECHNICAL BACKGROUND

In a wireless communication network, a service flow is a virtual communication link between a user's wireless communication device and another communication device, such as a network gateway. There may be multiple service flows between the user communication device and the other device. Each of the service flows typically supports a different user application. For example, a first service flow may support a voice application and a second service flow may support a video application.

The wireless communication network applies individual data rate limits to each of the service flows. For example, the first service flow may be limited to 200 kilobits per second (kbps) and the second service flow may be limited to 500 kbps. These data rate limits are not effectively coordinated. Thus, if the user is not using the first service flow, the second service flow is still limited to its original data rate. In the above example, the second service flow supporting the video application is still limited to 500 kbps even if the first service flow supporting the voice application goes unused.

OVERVIEW

A data transfer system receives a first service flow, a second service flow, and a third service flow that comprise a data session for a user device. The data transfer system transfers the first service flow to a scheduler using a first data rate limit and transfers the second service flow to the scheduler using a second data rate limit. The data transfer system also transfers the third service flow to the scheduler. The scheduler schedules transfers of the first service flow and the second service flow at a higher priority than transfers of the third service flow. The data transfer system transfers the first service flow, the second service flow, and the third service based on the prioritized schedule and using a third data rate limit. Thus, the first and second service flows receive a limited amount of preferential bandwidth, and the third service flow obtains unused bandwidth from the first and second service flows, subject to the third data rate limit.

DETAILED DESCRIPTION

Figure 1:
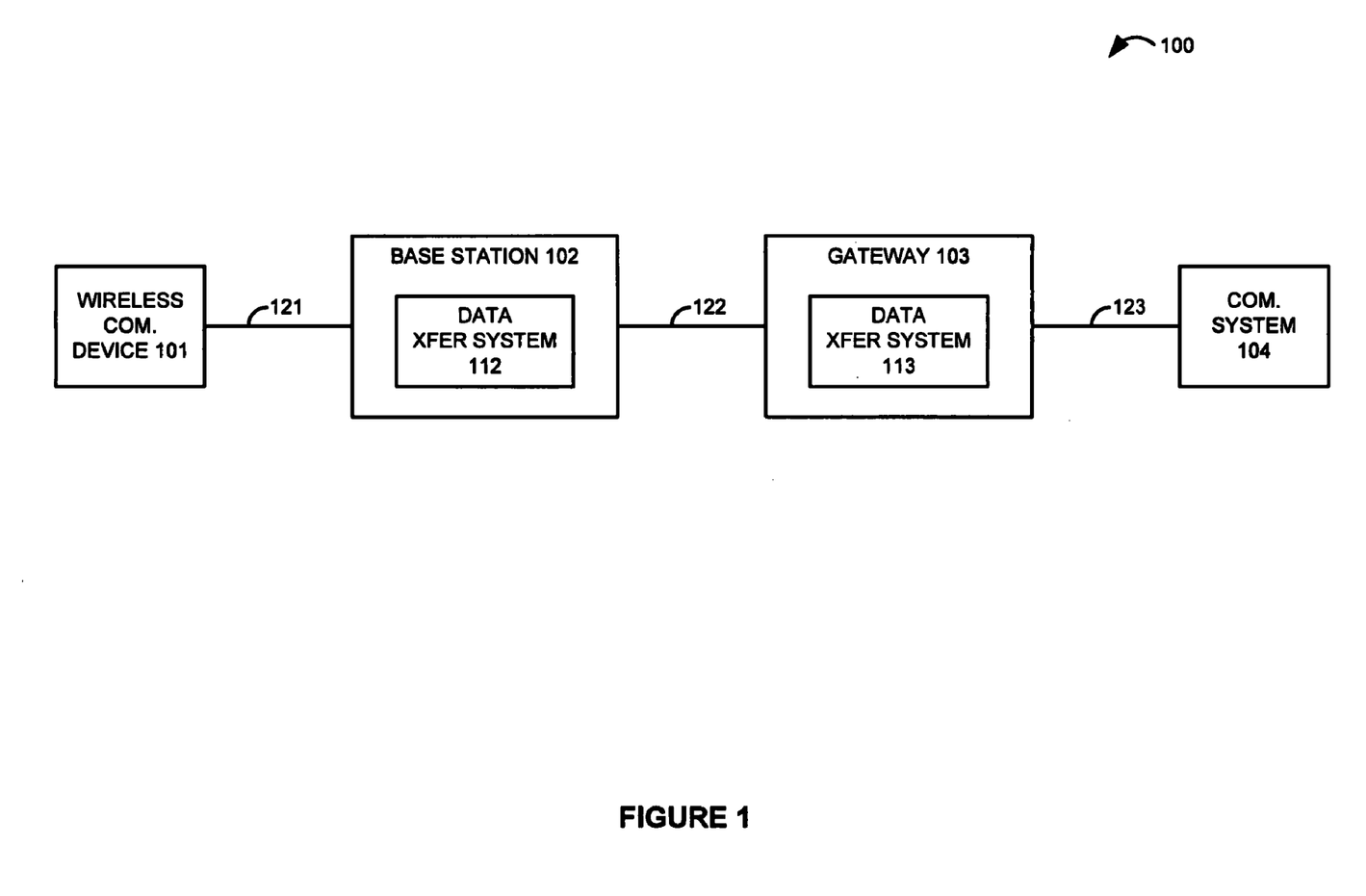
FIG. 1 is a block diagram that illustrates the configuration and operation of a communication system.

FIG. 1 is a block diagram that illustrates communication system 100. Communication system 100 comprises wireless communication device 101, base station 102, gateway 103, and communication system 104. Base station 102 includes data transfer system 112. Gateway 103 includes data transfer system 113. Wireless communication device 101 and base station 102 wirelessly communicate over wireless link 121. Base station 121 and gateway 103 communicate over link 122. Gateway 103 and communication system 104 communicate over link 123. Note that communication system 104 and link 123 represent multiple links and communication components, but have been simplified for clarity.

Wireless communication device 101 comprises a telephone, wireless transceiver, computer, digital assistant, internet-access device, or some other communication apparatus—including combinations thereof. Wireless communication device 101 could be a mobile Internet-access device that uses Worldwide Interoperability for Microwave Access (WiMAX), although other wireless protocols could be used. Base station 102 comprises antennas, data transfer systems, amplifiers, transceivers, filters, routers, or some other type of communication equipment—including combinations thereof. Gateway 103 comprises routers, interworking systems, data transfer systems, servers, or some other type of communication equipment—including combinations thereof. Communication system 104 comprises routers, servers, user communication devices, service nodes, or some other type of communication equipment—including combinations thereof. Links 121-123 could be direct links or they might include various intermediate components, systems, and networks.

Wireless communication device 101 establishes a data session that comprises multiple service flows. The individual service flows are typically identified by Internet Protocol (IP) source address, IP destination address, and IP port number, although other techniques for logically or virtually separating communication traffic could be used. For example, the service flows may be individually identified by DiffServ markings.

In this example, the data session has three service flows, although there could be more than three service flows in other examples. Base station 102 receives the three service flows for the data session from wireless communication device 101 over wireless link 121. In base station 101, data transfer system 112 transfers the first service flow to an internal scheduler using a first data rate limit. Data transfer system 112 transfers the second service flow to the internal scheduler using a second data rate limit. The data rate limits could be specified by a maximum allowed bits per second for the service flow. Data transfer system 112 also transfers the third service flow to the internal scheduler without using any individual data rate limit. The scheduler in data transfer system 112 schedules the transfer of the first service flow and the second service flow at a higher priority than the transfer of the third service flow. The higher priority means that if data from the first or second service flow is available for transfer, it will be transferred before available data from the third service flow. Data transfer system 112 transfers the first service flow, the second service flow, and the third service to gateway 103 over link 122 based on the schedule and using a third data rate limit.

In a reciprocal fashion, gateway 103 receives three service flows from communication system 104 over link 123. In gateway 103, data transfer system 113 transfers the first service flow to an internal scheduler using a first data rate limit. Data transfer system 113 transfers the second service flow to the internal scheduler using a second data rate limit. The data rate limits could be specified by a maximum allowed bits per second for the service flow. Data transfer system 113 also transfers the third service flow to the scheduler without a data rate limit. The scheduler in data transfer system 113 schedules the transfer of the first service flow and the second service flow at a higher priority than the transfer of the third service flow. Data transfer system 113 transfers the first service flow, the second service flow, and the third service to base station 102 over link 122 based on the schedule and using a third data rate limit.

Although the first and second service flows are individually rate limited, they receive higher scheduling priority than the third service flow. Also note that the third service flow is subject to (shares) the third rate limit along with the first and second service flows, but the third service flow is not subject to an individual rate limit. Thus, the third service flow may use bandwidth that is not being used by the first and second service flows—within the confines of the third rate limit.

In some examples, the first and second service flows comprise real-time protocol data while the third service flow comprises best-effort data. The best-effort data may burst to higher bandwidths when the real-time service flows are not in use. In addition, the real-time service flows are protected by preferential scheduling to provide steady bandwidth that is not affected by bursts in the third service flow. For example, the first and second service flows could comprise streaming voice and video data, while the third service flow comprises mobile Internet and email data. The mobile Internet and email data may burst to higher bandwidths when the voice and/or video service flows are not in use. Advantageously, the streaming voice and video service flows are protected by preferential scheduling to provide steady bandwidth that is not affected by bursts in the mobile Internet and email data.

Figure 2:
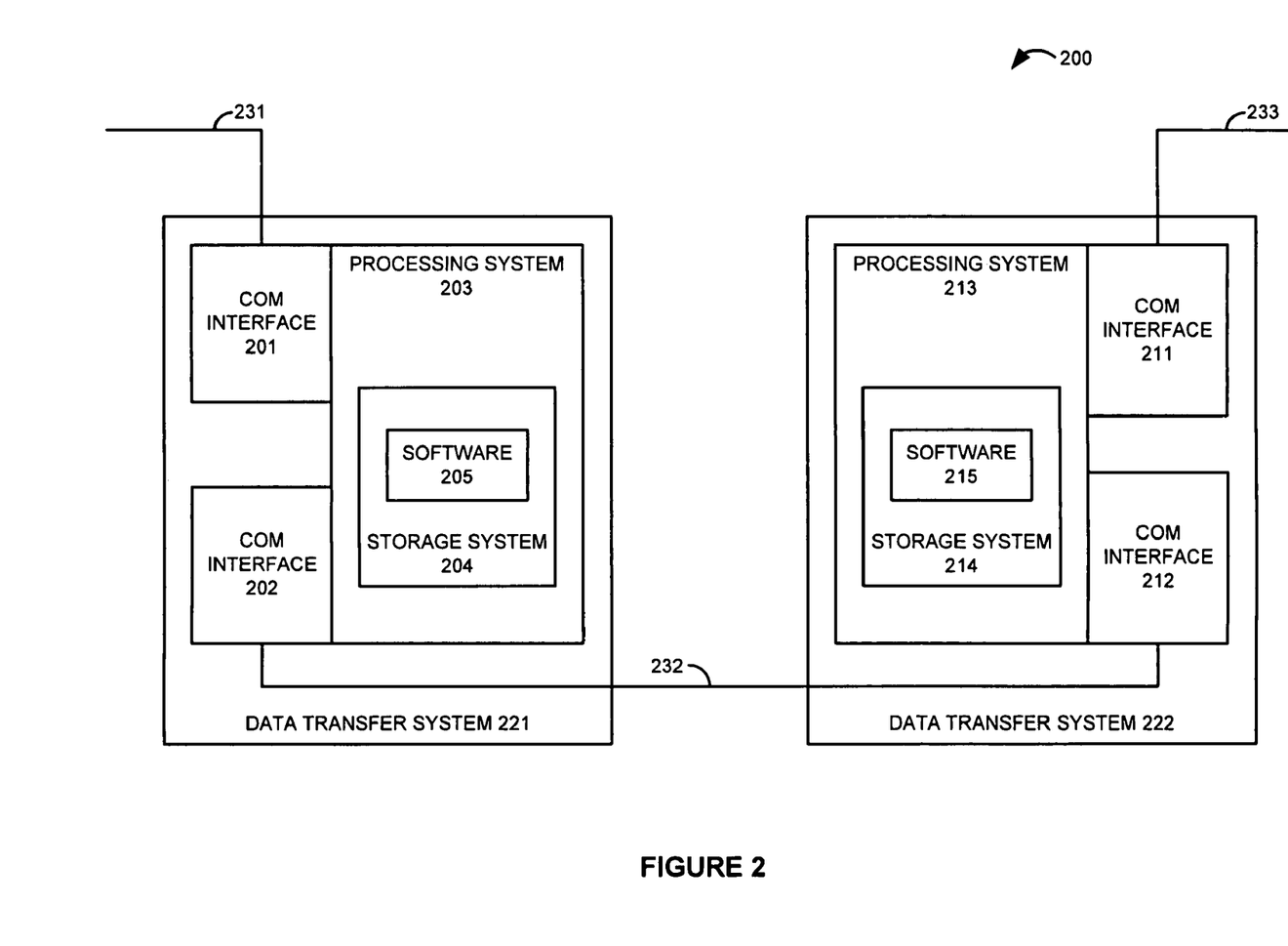
FIG. 2 is a block diagram that illustrates the configuration and operation of a communication system.

FIG. 2 is a block diagram that illustrates communication system 200. Communication system 200 comprises data transfer systems 221-222. Data transfer systems 221-222 comprise examples of data transfer systems 112-113, although systems 111-112 could use other configurations. Data transfer system 221 includes communication interfaces 201-202 and processing system 203. Processing system 203 includes storage system 204 that stores software 205. Processing system 203 is operationally coupled to communication interfaces 201-202. Data transfer system 222 includes communication interfaces 211-212 and processing system 213. Processing system 213 includes storage system 214 that stores software 215. Processing system 213 is operationally coupled to communication interfaces 211-212.

Communication interface 201 is coupled to link 231. Communication interfaces 202 and 212 are coupled to link 232. Communication interface 211 is coupled to link 233. Links 231-233 could use various communication media, such as air, metal, optical fiber, or some other signal propagation path—including combinations thereof. Links 231-233 could use various protocols, such as internet, telephony, optical networking, wireless communication, code division multiple access, worldwide interoperability for microwave access, or some other communication format—including combinations thereof. Links 231-233 could be direct links or they might include various intermediate components, systems, and networks.

Communication interfaces 201-202 and 211-212 comprise network interfaces, transceivers, antennas, circuitry, memory, or some other communication components—including combinations thereof. Communication interfaces 201-202 operate under the control of processing system 203 to identify, rate-limit, and transfer service flows. Communication interfaces 211-212 operate under the control of processing system 213 to identify, rate-limit, and transfer service flows.

Processing system 203 comprises microprocessor and associated circuitry that schedule and transfer data between communication interfaces 201-202. To perform the scheduling and transfers, processing system 203 retrieves and executes software 205 from storage system 204. Storage system 204 comprises a disk drive, flash drive, memory circuitry, or some other memory device. Software 205 comprises computer programs, firmware, or some other form of machine-readable processing instructions. Software 205 may include an operating system, utilities, drivers, network interfaces, applications, or some other type of software. When executed, software 205 directs processing system 203 to: provide rate-limiting control to communication interfaces 201-202, schedule data transfers between communication interfaces 201-202, and perform data transfers between communication interfaces 201-202 based on the schedule.

Processing system 213 comprises microprocessor and associated circuitry that schedule and transfer data between communication interfaces 211-212. To perform the scheduling and transfers, processing system 213 retrieves and executes software 215 from storage system 214. Storage system 214 comprises a disk drive, flash drive, memory circuitry, or some other memory device. Software 215 comprises computer programs, firmware, or some other form of machine-readable processing instructions. Software 215 may include an operating system, utilities, drivers, network interfaces, applications, or some other type of software. When executed, software 215 directs processing system 203 to: provide rate-limiting control to communication interfaces 211-212, schedule data transfers between communication interfaces 211-212, and perform data transfers between communication interfaces 211-212 based on the schedule.

In operation, communication interface 201 receives three service flows for a data session over link 231. Communication interface 201 transfers the first service flow to processing system 203 using a first data rate limit. Communication interface 201 transfers the second service flow to processing system 203 using a second data rate limit. Communication interface 201 transfers the third service flow to processing system 203 without using a data rate limit. Processing system 203 schedules the transfer of the first service flow and the second service flow at a higher priority than the transfer of the third service flow. Thus, available data from the first and second service flows is scheduled for transfer before available data from the third service flow. Processing system 203 then transfers the service flows to communication interface 202 based on the schedule. Communication interface 202 transfers the first service flow, the second service flow, and the third service flow to data transfer system 222 over link 232 based on the schedule and using a third data rate limit.

In some examples, processing system 203 provides the service flows to communication interface 202 in an order based on the schedule, and communication interface 202 transfers the service flows in order based on the third data rate. In other examples, processing system 203 transfers the service flows and the schedule to communication interface 202, and communication interface 202 transfers the service flows based on the third data rate and the schedule.

In a reciprocal manner, communication interface 211 receives three service flows for a data session over link 233. Communication interface 211 transfers the first service flow to processing system 213 using a first data rate limit. Communication interface 211 transfers the second service flow to processing system 213 using a second data rate limit. Communication interface 211 transfers the third service flow to processing system 213 without using a data rate limit. Processing system 213 schedules the transfer of the first service flow and the second service flow at a higher priority than the transfer of the third service flow. Thus, available data from the first and second service flows is scheduled for transfer before available data from the third service flow. Processing system 213 then transfers the service flows to communication interface 212 based on the schedule. Communication interface 212 transfers the first service flow, the second service flow, and the third service flow to data transfer system 221 over link 232 based on the schedule and using a third data rate limit.

In some examples, processing system 213 presents the service flows to communication interface 212 in an order based on the schedule, and communication interface 212 transfers the service flows in order based on the third data rate. In other examples, processing system 213 transfers the service flows and the schedule to communication interface 212, and communication interface 212 transfers the service flows based on the third data rate and the schedule.

Although the first and second service flows are individually rate limited, they receive higher scheduling priority than the third service flow. Thus, they get a limited amount of bandwidth on a preferred basis. The third service flow shares the third rate limit along with the first and second service flows, but the third service flow is not subject to an individual rate limit. Thus, the third service flow may use bandwidth that is not being used by the first and second service flows—within the confines of the third rate limit.

Figure 3:
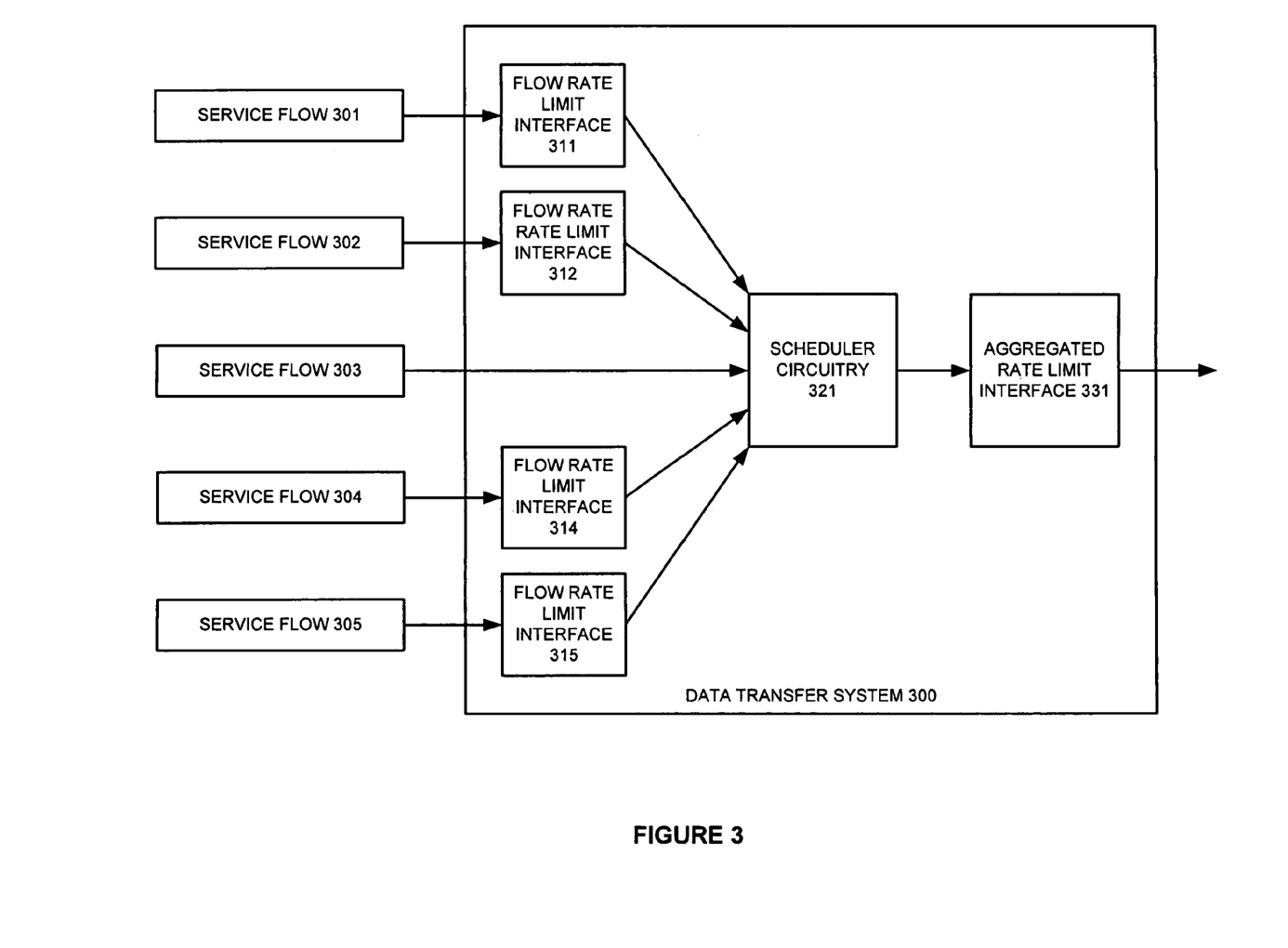
FIG. 3 is a block diagram that illustrates a data transfer system.

FIG. 3 is a block diagram that illustrates data transfer system 300. Data transfer system 300 comprises flow rate limit interfaces 311-312 and 314-315, scheduler circuitry 321, and aggregated rate limit interface 331. Data transfer system 300 comprises an example of data transfer systems 112-113 and 221-222, although systems 112-113 and 221-222 could use other configurations.

Flow rate limit interfaces 311, 312, 314, and 315 receive and limit the data rate of respective service flows 301, 302, 304, and 305. Thus, flow rate limit interfaces 311, 312, 314, and 315 apply individual data rate limits to individual service flows. Flow rate limit interfaces 311, 312, 314, and 315 transfer individually rate-limited service flows 301, 302, 304, and 305 to scheduler circuitry 321.

Scheduler circuitry 321 also receives service flow 303, which was not individually rate limited. Scheduler circuitry 321 schedules the transfer of service flows 301-305 by scheduling individually rate-limited service flows 301, 302, 304, and 305 on a higher priority than service flow 303. Scheduler circuitry 321 transfers service flows 301-305 to aggregated rate limit interface 331 based on the schedule.

Aggregated rate limit interface 331 receives and limits the data rate of aggregated service flows 301-305. Thus, aggregated rate limit interface 331 applies a shared data rate limit to all service flows 301-305. Aggregated rate limit interface 331 transfers service flows 301-305 from data transfer system 300.

Although service flows 301, 302, 304, and 305 are individually rate limited, they receive higher scheduling priority than service flow 303. Thus, their limited bandwidth is more reliable. Service flow 305 shares the aggregated rate limit along with service flows 301, 302, 304, and 305, but service flow 303 is not subject to an individual rate limit. Thus, service flow 303 may use bandwidth that is not being used by service flows 301, 302, 304, and 305—within the confines of the aggregated rate limit.

Service flows 301-305 could be real-time data, best effort data, or some other type of data. The individual flow rate limits could be 100 Kbps, 200 Kbps, 300 Kbps, 400 Kbps, 1.5 Mbps, or some other data rate. The aggregated rate limit could be 1.5 Mbps, 2.5 Mbps, or some other data rate. For example, service flow 301 could be real-time protocol voice data with a 100 Kbps rate limit. Service flow 302 could be real-time protocol video data with a 200 Kbps rate limit. Service flow 303 could be best effort data without an individual rate limit. Service flow 304 could be real-time, file transfer protocol data with a 300 Kbps rate limit. Service flow 305 could be best effort http/email data with a 400 Kbps rate limit. The aggregated rate limit could be 1.5 Mbps.

Figure 4:
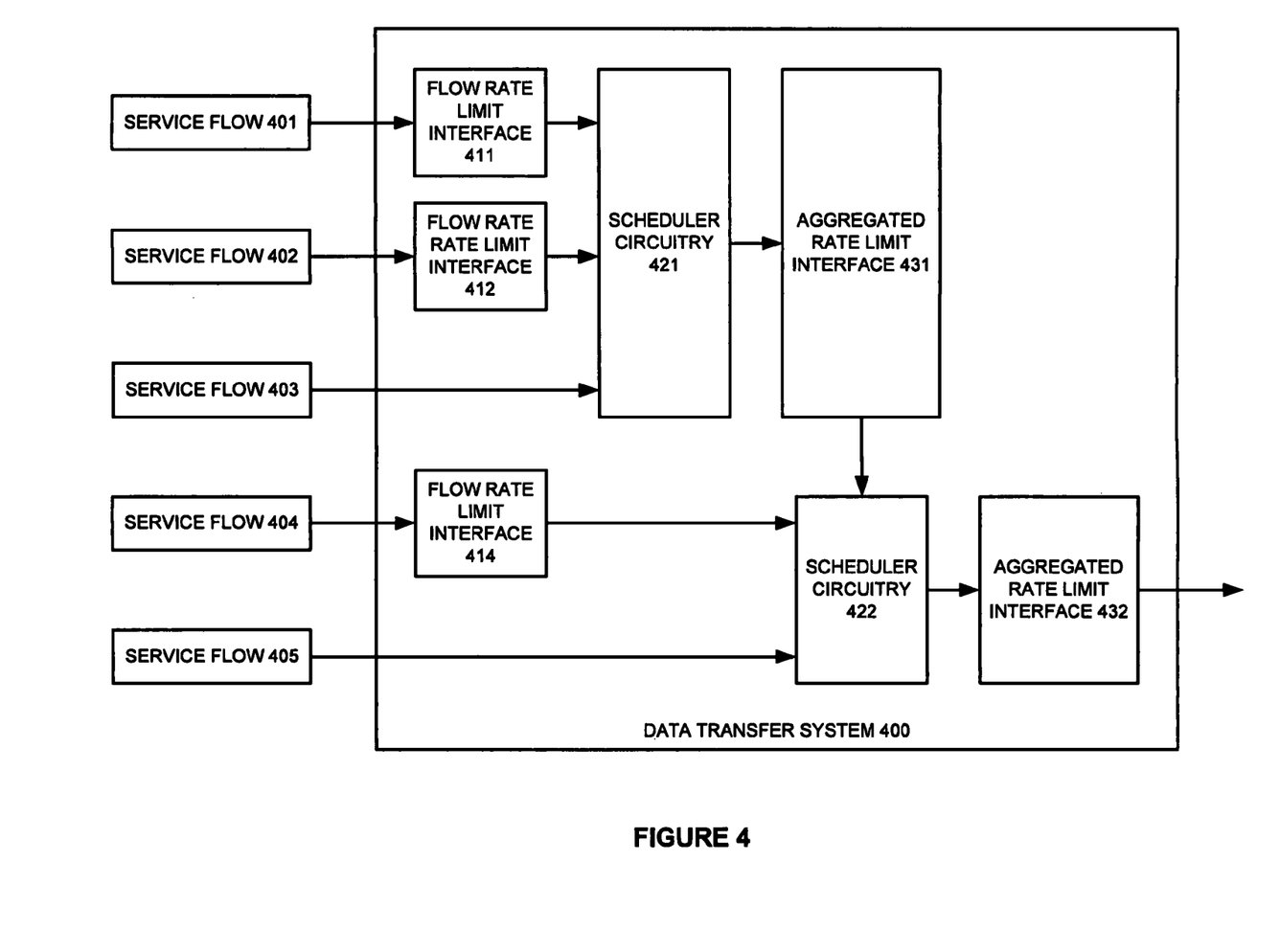
FIG. 4 is a block diagram that illustrates a two-stage data transfer system.

FIG. 4 is a block diagram that illustrates a two-stage data transfer system 400. Data transfer system 400 comprises flow rate limit interfaces 411, 412, and 414, scheduler circuitry 421-422, and aggregated rate limit interfaces 431-432. Data transfer system 400 comprises an example of data transfer systems 112-113 and 221-222, although systems 112-113 and 221-222 could use other configurations.

Flow rate limit interfaces 411-412 receive and individually limit the data rate of respective service flows 401-402. Flow rate limit interfaces 411-412 transfer individually rate-limited service flows 401-402 to scheduler circuitry 421. Scheduler circuitry 421 also receives service flow 403, which was not individually rate limited. Scheduler circuitry 421 schedules the transfer of service flows 401-403 by scheduling individually rate-limited service flows 401-402 on a higher priority than service flow 403. Scheduler circuitry 421 transfers service flows 401-403 to aggregated rate limit interface 431 based on the schedule. Aggregated rate limit interface 431 receives and limits the data rate of aggregated service flows 401-403. Thus, aggregated rate limit interface 431 applies a shared data rate limit to service flows 401-403. Aggregated rate limit interface 431 transfers service flows 401-403 to scheduler circuitry 422.

Flow rate limit interface 414 receives and individually limits the data rate of service flow 404. Flow rate limit interface 414 transfers individually rate-limited service flow 404 to scheduler circuitry 422. Scheduler circuitry 422 receives service flow 405, which was not individually rate limited. Scheduler circuitry 422 also receives service flows 401-403 from aggregated rate limit interface 431. Scheduler circuitry 422 schedules the transfer of service flows 401-405 by scheduling individually rate-limited service flows 401-404 on a higher priority than service flow 405. Scheduler circuitry 422 transfers service flows 401-405 to aggregated rate limit interface 432 based on the schedule. Aggregated rate limit interface 432 receives and limits the data rate of aggregated service flows 401-405. Thus, aggregated rate limit interface 432 applies a shared data rate limit to service flows 401-405. Aggregated rate limit interface 432 transfers service flows 401-405 from data transfer system 400.

Data transfer system 400 illustrates a two-stage data transfer system, although additional stages could be added in a similar manner. In the first stage, service flows 401-402 are individually rate limited but get preferential scheduling over service flow 403, which is not individually rate limited. Service flow 403 gets unused bandwidth from service flows 401-402, subject to a first-stage aggregated rate limit. In the second stage, service flow 404 is individually rate limited, and service flows 401-404 receive higher scheduling priority than service flow 405, which is not individually rate limited. Thus, service flows 401-404 are rate limited and get preferential scheduling over service flow 405, while service flow 405 gets unused bandwidth from service flows 401-405, subject to a second-stage aggregated rate limit.

Figure 5:
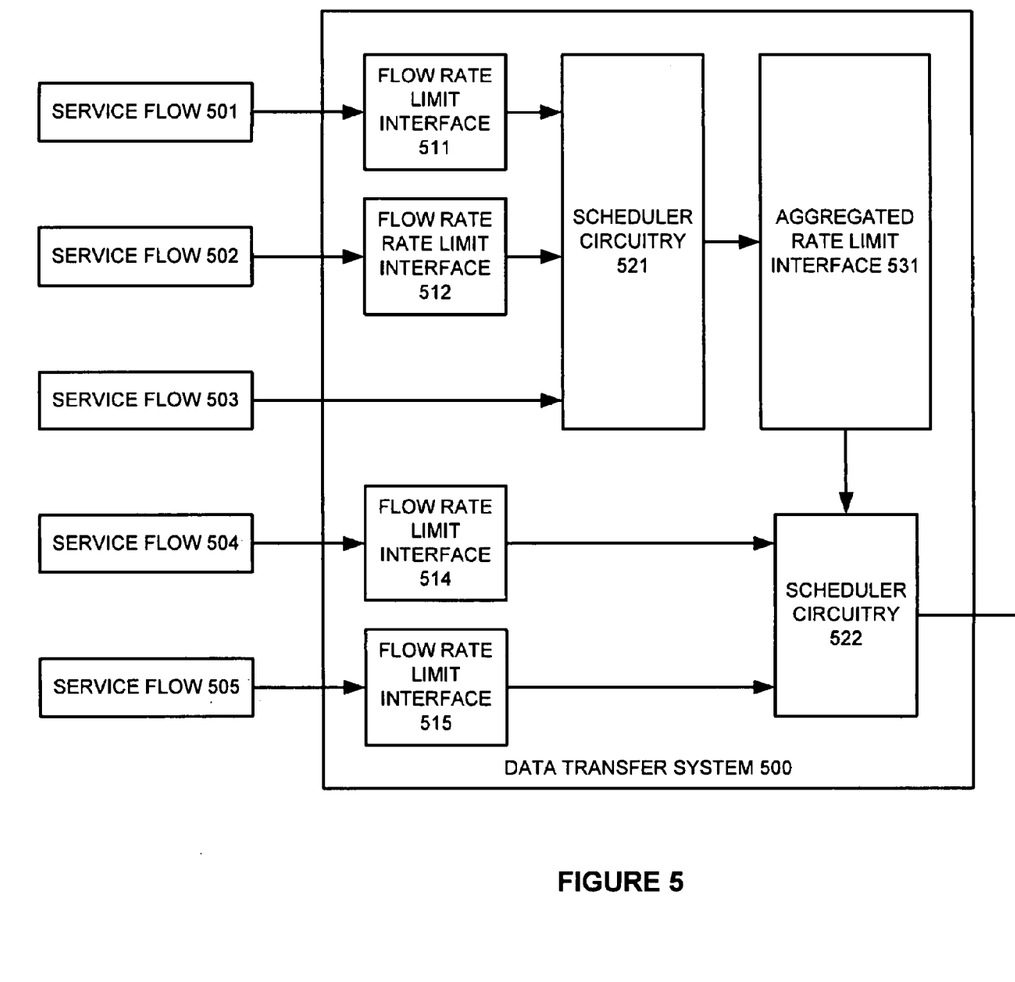
FIG. 5 is a block diagram that illustrates a data transfer system with service flows that are not subject to an aggregated rate limit.

FIG. 5 is a block diagram that illustrates a data transfer system 500 with service flows that are not subject to an aggregated rate limit. Data transfer system 500 comprises flow rate limit interfaces 511, 512, 514, and 515, scheduler circuitry 521-522, and aggregated rate limit interface 531.

Data transfer system 500 comprises an example of data transfer systems 112-113 and 221-222, although systems 112-113 and 221-222 could use other configurations.

Flow rate limit interfaces 511-512 receive and individually limit the data rate of respective service flows 501-502. Flow rate limit interfaces 511-512 transfer individually rate-limited service flows 501-502 to scheduler circuitry 521. Scheduler circuitry 521 also receives service flow 503, which was not individually rate limited. Scheduler circuitry 521 schedules the transfer of service flows 501-503 by scheduling individually rate-limited service flows 501-502 on a higher priority than service flow 503. Scheduler circuitry 521 transfers service flows 501-503 to aggregated rate limit interface 531 based on the schedule. Aggregated rate limit interface 531 receives and limits the data rate of aggregated service flows 501-503. Thus, aggregated rate limit interface 531 applies a shared data rate limit to service flows 501-503. Aggregated rate limit interface 531 transfers service flows 501-503 to scheduler circuitry 522.

Flow rate limit interfaces 514-515 receive and individually limit the data rate of service flows 504-505. Flow rate limit interfaces 514-515 transfer individually rate-limited service flows 504-505 to scheduler circuitry 522. Scheduler circuitry 522 also receives service flows 501-503 from aggregated rate limit interface 531. Scheduler circuitry 522 schedules the transfer of service flows 501-505 using various techniques that may or may not use a priority scheme. For example, scheduler circuitry 522 may use round robin, fist-in/first out, prioritization, or some other scheduling technique. Scheduler circuitry 522 transfers service flows 501-505 from data transfer system 500 based on the schedule.

Data transfer system 500 allows service flows 504-505 to skip the aggregated rate limit. Service flows 501-502 are individually rate limited but get preferential scheduling over service flow 503, which is not individually rate limited. Service flow 503 gets unused bandwidth from service flows 501-502, subject to the aggregated rate limit. Service flows 504-505 are individually rate limited, but are not subject to the aggregated rate limit.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of transferring data for a data session for a user device, the method comprising:
   receiving at a first flow rate limit interface a first service flow, a second service flow, and a third service flow for the data session;
   transferring from the first flow rate limit interface to a scheduler the first service flow using a first data rate limit, the second service flow using a second data rate limit, and the third service flow;
   scheduling at the scheduler transfers of the first service flow and the second service flow at a higher priority than transfers of the third service flow;
   transferring the first service flow, the second service flow, and the third service from the scheduler to a second flow rate limit interface based on the scheduling and transferring the first, second and third service flows from the second flow rate limit interface using a third data rate limit,
   wherein the third service flow uses unused bandwidth of at least one of the first and second service flows up to the third data rate limit.

2. The method of claim 1 wherein the first service flow, the second service flow, and the third service flow are identified by their destination internet protocol addresses and source internet protocol addresses.

3. The method of claim 2 wherein the first service flow, the second service flow, and the third service flow are identified by their respective destination internet protocol port numbers and source internet protocol port numbers.

4. The method of claim 1 wherein the first service flow, the second service flow, and the third service flow are identified by their respective DiffServ markings.

5. The method of claim 1 wherein the first service flow comprises real-time protocol data and the third service flow comprises best-effort data.

6. The method of claim 1 wherein the first service flow comprises voice data and the third service flow comprises mobile internet data.

7. The method of claim 1 wherein the user device comprises a wireless internet-access communication device and wherein receiving the first service flow, the second service flow, and the third service flow comprises wirelessly receiving the first service flow, the second service flow, and the third service flow into a base station from the wireless internet-access communication device.

8. The method of claim 1 wherein the user device comprises a wireless internet-access communication device and wherein transferring the first service flow, the second service flow, and the third service flow comprises transferring the first service flow, the second service flow, and the third service flow from a gateway to a base station for wireless delivery to the wireless internet-access communication device.

9. The method of claim 1 wherein the user device comprises a Wireless Interoperability for Microwave Access (WiMAX) device.

10. The method of claim 1 further comprising:
    receiving a fourth service flow and a fifth service flow for the data session;
    transferring the fourth service flow to the scheduler using a fourth data rate limit and transferring the fifth service flow to the scheduler using a fifth data rate limit;
    scheduling transfers of the fourth service flow and the fifth service flow at a higher priority than transfers of the third service flow;
    transferring the fourth service flow and the fifth service flow along with the first service flow, the second service flow, and the third service flow based on the scheduling and using the third data rate limit.

11. A data transfer system for a data session for a user device, the data transfer system comprising:
    a first communication interface configured to receive a first service flow, a second service flow, and a third service flow for the data session and to transfer the first service flow using a first data rate limit, transfer the second service flow using a second data rate limit, and transfer the third service flow;
    a processing system configured to receive the first service flow, the second service flow, and the third service flow from the first communication interface and to schedule transfers of the first service flow and the second service flow at a higher priority than transfers of the third service flow;
    a second communication interface to receive the first service flow, the second service flow, and the third service flow from the processing system and configured to transfer the first service flow, the second service flow, and the third service flow from the processing system based on the schedule and using a third data rate limit,
wherein the third service flow uses unused bandwidth of at least one of the first and second service flows up to the third data rate limit.

12. The data transfer system of claim 11 wherein the processing system is configured to identify the first service flow, the second service flow, and the third service flow by their destination internet protocol addresses and source internet protocol addresses.

13. The data transfer system of claim 12 wherein the processing system is configured to identify the first service flow, the second service flow, and the third service flow by their destination internet protocol port numbers and source internet protocol port numbers.

14. The data transfer system of claim 11 wherein the processing system is configured to identify the first service flow, the second service flow, and the third service flow their DiffServ markings.

15. The data transfer system of claim 11 wherein the first service flow comprises real-time protocol data and the third service flow comprises best-effort data.

16. The data transfer system of claim 11 wherein the first service flow comprises voice data and the third service flow comprises mobile internet data.

17. The data transfer system of claim 11 wherein the user device comprises a wireless internet-access communication device and wherein the first communication interface is configured to wirelessly receive the first service flow, the second service flow, and the third service flow into a base station from the wireless internet-access communication device.

18. The data transfer system of claim 11 wherein the user device comprises a wireless internet-access communication device and the second communication interface is configured to transfer the first service flow, the second service flow, and the third service flow to a base station for wireless delivery to the wireless internet-access communication device.

19. The data transfer system of claim 11 wherein the user device comprises a Wireless Interoperability for Microwave Access (WiMAX) device.

20. The data transfer system of claim 11 wherein:
the first communication interface is configured to receive a fourth service flow and a fifth service flow for the data session and to transfer the fourth service flow using a fourth data rate limit and transfer the fifth service flow using a fifth data rate limit;
the processing system is configured to receive the fourth service flow and the fifth service flow from the first communication interface and to schedule transfers of the fourth service flow and the fifth service flow at a higher priority than transfers of the third service flow; and
the second communication interface is configured to transfer the fourth service flow and the fifth service flow from the processing system along with the first service flow, the second service flow, and the third service flow based on the schedule and using the third data rate limit.

* * * * *